United States Patent [19]

Williams et al.

[11] Patent Number: 4,522,554
[45] Date of Patent: Jun. 11, 1985

[54] TRACTOR FRONT LOADER

[75] Inventors: Frederick Williams, Warrington; Anthony D. Coe, Manchester, both of England

[73] Assignee: David Brown Tractors Ltd., Meltham, England

[21] Appl. No.: 553,261

[22] Filed: Nov. 18, 1983

[30] Foreign Application Priority Data

Nov. 24, 1982 [GB] United Kingdom ................ 8233529

[51] Int. Cl.³ ............................................. E02F 3/70
[52] U.S. Cl. ...................................... 414/686; 92/15; 187/8.49; 298/17 B
[58] Field of Search .............. 414/686, 723; 298/17 B; 188/67; 212/222; 172/274, 466, 481; 187/8.47, 8.49; 92/15, 17, 19; 37/117.5

[56] References Cited

U.S. PATENT DOCUMENTS 4,257,730 3/1981 Kawakita ............................ 414/686
4,275,984 6/1981 Lenertz ............................... 414/686
4,383,793 5/1983 Weir ................................... 414/686

FOREIGN PATENT DOCUMENTS 1531063 8/1969 Fed. Rep. of Germany ...... 414/723

Primary Examiner—Terrance L. Siemens

[57] ABSTRACT

In front loaders designed for drive-in attachment to tractors, two telescopic struts are pivotable between a stowed retracted position alongside the boom assembly which carries the bucket; a first deployed extended position for supporting the rear end of the detachable main portion of the loader, aided by auxiliary struts, when it is not attached to the tractor; and a second deployed extended position, in which the struts engage with abutments on the sub-frame which carries both the boom assembly and the hydraulic cylinders for pivoting the boom assembly and are secured to said cylinders, for locking the boom assembly in its fully raised position whilst the detachable main portion is attached to the tractor.

3 Claims, 2 Drawing Figures

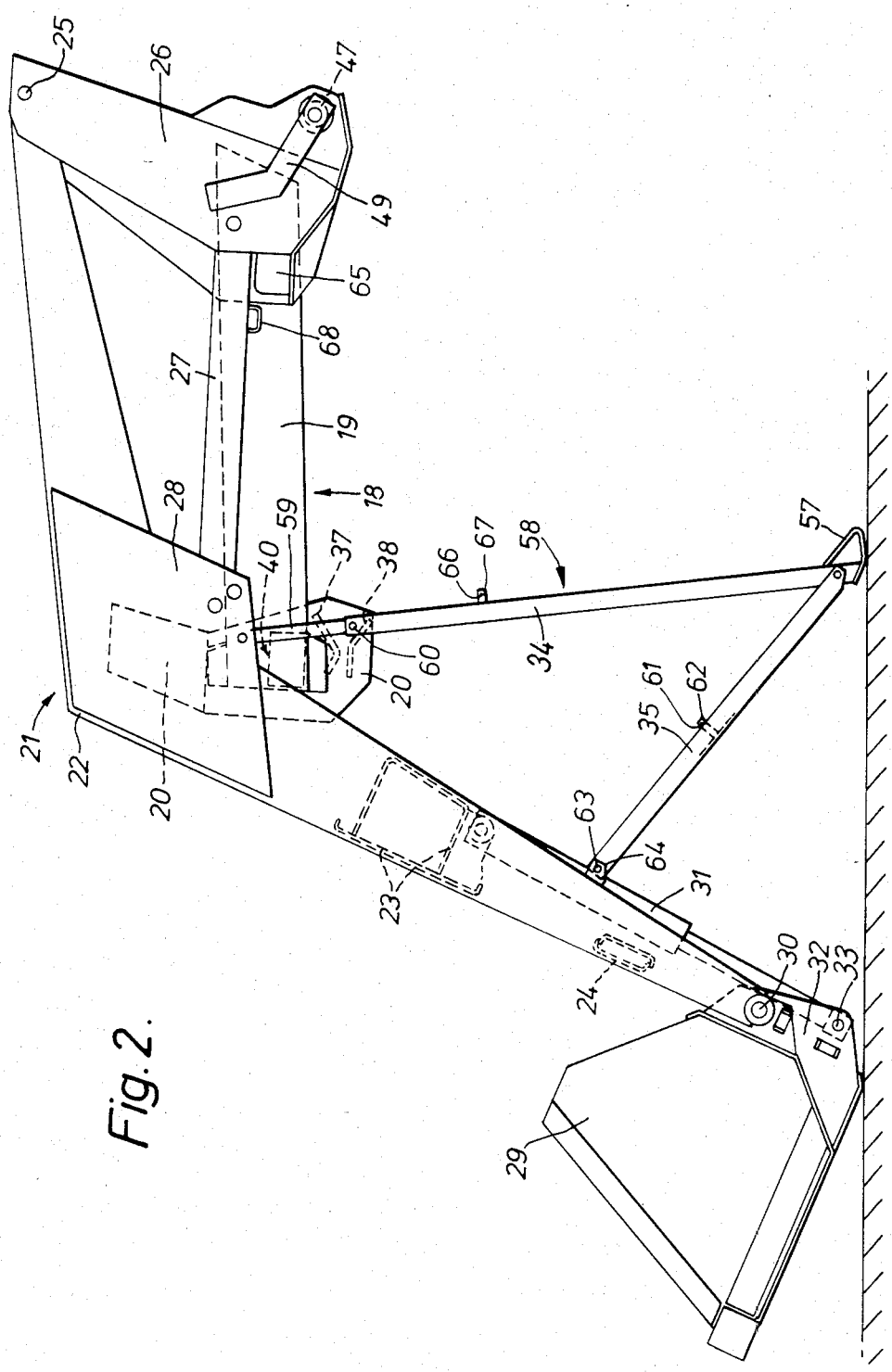

TRACTOR FRONT LOADER

BACKGROUND OF INVENTION

This invention relates to a tractor front loader, and more particularly to a front loader designed for drive-in attachment to a tractor, that is to say to a front loader having brackets adapted to be permanently secured to a tractor and engageable with a detachable main portion of the loader which is adapted to be supported when not in use at the required height for drive-in attachment.

When not in use, the detachable portion is supported at its front end by its bucket whilst its rear end is supported by two struts which are disposed at respective sides of said portion and hitherto have simply been pivotable between a stowed position and a deployed support position.

The object of the present invention is to utilise the support struts to better effect.

SUMMARY OF INVENTION

According to the invention, in a front loader designed for drive-in attachment to a tractor, comprising front and rear bracket means adapted to be permanently secured to the tractor frame, a sub-frame adapted to be temporarily secured to the bracket means, a loader boom assembly pivotably mounted on the sub-frame, a loader bucket or the like pivotably mounted on the boom assembly, and hydraulic piston-and-cylinder assemblies for selectively pivoting the boom assembly and the bucket, two support struts disposed at respective sides of the boom assembly are pivotable between a stowed position, a first deployed position in which they support the rear end of the sub-frame at drive-in height when it is not attached to the tractor, and a second deployed position in which they lock the boom assembly in its fully raised position whilst the sub-frame is attached to the tractor.

BRIEF DESCRIPTION OF DRAWINGS

A preferred embodiment of the invention will now be described, by way of example only, with reference to the accompanying drawings of which:

FIG. 2 is a side elevation of a main portion of the loader which has been supported at the required height for drive-in attachment and then detached from the tractor.

DESCRIPTION OF PREFERRED EMBODIMENT

Figure 1:
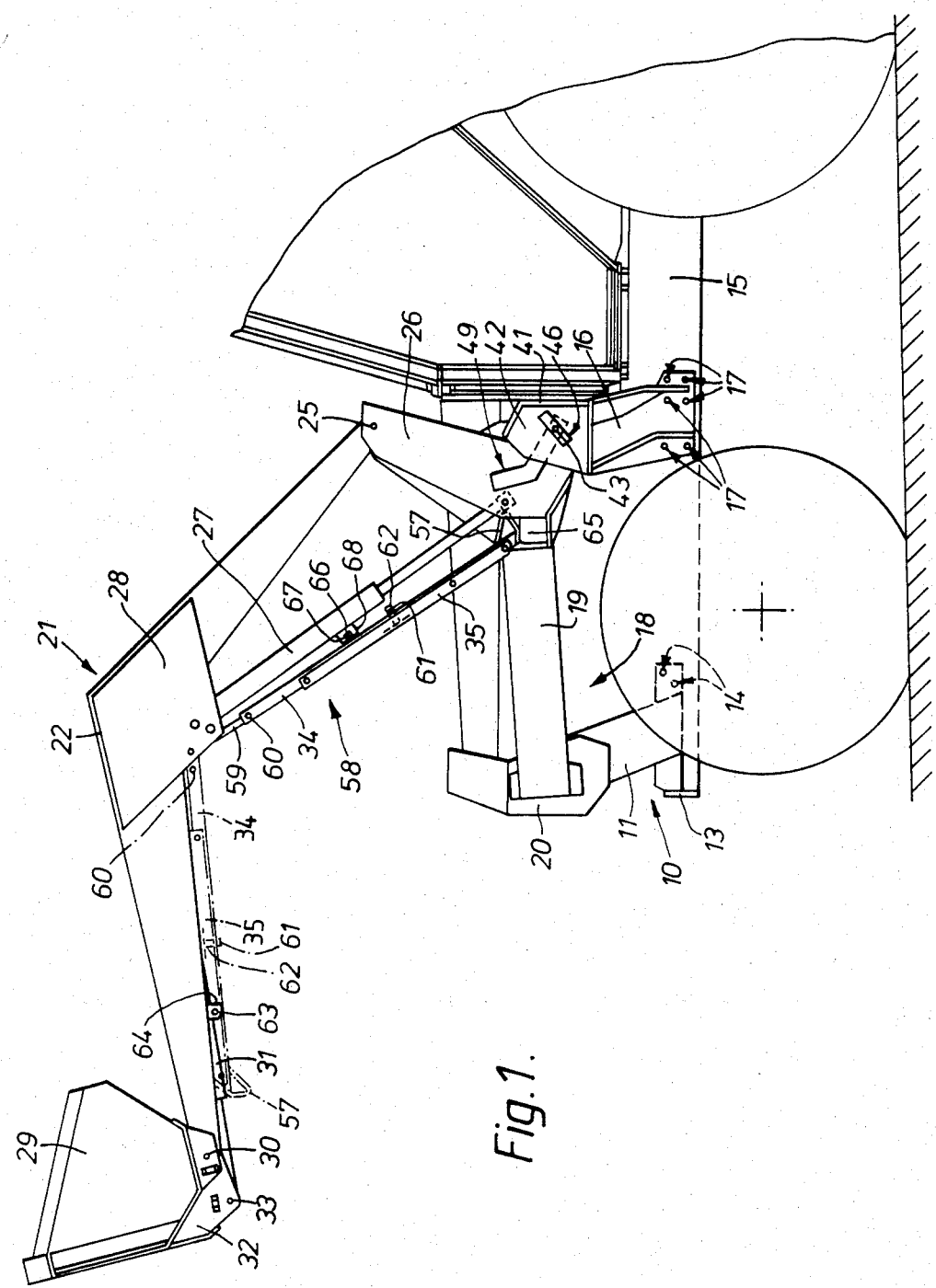
FIG. 1 is a side elevation of the front portion of a tractor having attached to it a front loader which is locked in its fully raised position.

Referring now to FIG. 1 of the drawings, a front loader designed for drive-in attachment to a tractor includes a front attachment bracket indicated generally at 10 comprising two side plates 11 interconnected near their upper ends by a transverse bar (not shown) and welded at their lower ends to a basically U-shaped ballast-weight carrier 13 the arms of which are adapted to be permanently secured by set-screws at 14 near the front of the tractor frame 15 at each side thereof; and two rear attachment brackets 16 adapted to be permanently secured by set-screws at 17 near the mid-point of the length of the tractor frame 15 at each side thereof.

Referring now to both FIGS. of the drawings, a detachable main portion of the loader includes a sub-frame indicated generally at 18 adapted to be temporarily secured to the brackets 10 and 16 which is substantially U-shaped in plan view and comprises two elongated side members 19 interconnected at their front ends by a radiator guard 20. A loader boom assembly indicated generally at 21 comprising two parallel booms 22 of shallow inverted V-shape interconnected between their apices and front ends by two cross-members 23 and 24 has the rear ends of its booms 22 pivotably mounted about a common transverse axis 25 on the upper ends of respective pedestals 26 secured by welding to the rear ends of the side members 19 of the sub-frame 18, and the boom assembly 21 is pivotable relative to the sub-frame 18 by two hydraulic piston-and-cylinder assemblies 27 each of which is pivotally connected between the lower end of one of the pedestals 26 and a stiffening plate 28 welded to the apex of the associated boom 22. A loader bucket 29, or a similar tool such as a manure fork, is pivotably mounted about a common transverse axis 30 on the front ends of the booms 22, and is pivotable relative to the boom assembly 21 by two hydraulic piston-and-cylinder assemblies 31 each of which is pivotally connected between the rearmost cross-member 23 and a hole in a lug 32 near one side of the bucket 29, the common axis 33 of the holes in the lugs 32 being spaced from but parallel to the pivot axis 30 of the bucket 29. The sub-frame 18 locates on the front bracket 10 by means of two horizontal ribs (not shown) fixed to and projecting laterally outwards from the respective side plates 11 and each engageable between upper and lower forwardly converging guides 37 and 38 respectively which are fixed to and project laterally inwards from the adjacent side of the radiator guard 20, and also by means of two wedges (not shown) secured to and projecting laterally outwards from the respective side plates 11 and each engageable with one of two mutually forwardly converging plates 40 secured to and projecting laterally inwards from the respective sides of the radiator quard 20. Either the plates 40 or the associated wedges are made adjustable in a fore-and-aft direction. The upper part of each rear bracket 16 is substantially U-shaped in plan view, with a rear wall 41 and two mainly parallel side walls 42, and the lower rear corner of each pedestal 26 of the sub-frame 18 is secured within the upper part of the associated rear bracket 16 by an easy-release attachment pin 43 with a hand-grip 46 and an associated eccentric bush 47 with a handle 49 which form the subject of our U.S. patent application Ser. No. 502,051.

A telescopic support strut indicated generally at 58 is pivotably mounted on each stiffening plate 28, just forward of the point of connection to said plate of the associated piston-and-cylinder assembly 27, and comprises inner and outer members 59 and 34 respectively adapted to be releasably locked together by a pin 60 in each of its extended and retracted positions. The outer member 35 has a foot 57 welded to its free end, and pivotably mounted on it near said end is an auxiliary strut 35 which can be secured in contiguous parallel inoperative relationship thereto as shown in FIG. 1 by passing a linch-pin (not shown) through a diametrical hole 61 in a peg 62 welded to the auxiliary strut 35 and adapted to project through a hole in the outer member 34. Each support strut 58 can occupy three positions. Its stowed position shown in broken lines in FIG. 1 is in retracted condition along the underside of the forward part of the associated boom 22, where it is secured by a pin 63 passing through aligned holes in the outer member 34, the auxiliary strut 35 and a pair of lugs 64 welded to said boom. Its first deployed position shown in FIG. 2, in which its foot 57 contacts the ground in order to support the rear end of the detacheable main portion of the loader at drive-in height whilst said portion is not attached to the tractor and the front end of said portion is supported by the lowered bucket 29 or the like, is in extended condition at an angle of, say, 40° to the forward part of the associated boom 22, to which it is secured by removing the linch-pin associated with the peg 62 welded to the auxiliary strut 35 and pivoting said strut to a poaition in which its free end can be connected to the lugs 64 welded to said boom by the pin 63 used to secure the support strut 58 in its stowed position. Its second deployed position shown in full lines in FIG. 1, in which its foot 57 engages an abutment 65 at the lower front corner of the associated pedestal 26 in order to lock the boom assembly 21 mechanically in its fully raised position whilst the detachable main portion of the loader is attached to the tractor, is in extended condition closely adjacent the underside of the associated piston-and-cylinder assembly 27, to which it is secured by passing a linch-pin (not shown) through a diametrical hole 66 in a peg 67 welded to the outer member 34 and adapted to project through a hole in a U-shaped member 68 welded to the cylinder of said assembly.

We claim:

1. A front loader designed for drive-in attachment to a tractor, comprising front and rear bracket means adapted to be permanently secured to the tractor frame and a detachable main portion including a sub-frame adapted to be temporarily secured to the bracket means, a loader boom assembly pivotably mounted on the sub-frame, a loader bucket or the like pivotably mounted on the boom assembly, two hydraulic piston-and-cylinder assemblies disposed at respective sides of the boom assembly and pivotally connected between the sub-frame and points intermediate the length of the boom assembly for pivoting said assembly, and at least one hydraulic piston-and-cylinder assembly for pivoting the bucket, wherein two support struts disposed at respective sides of the boom assembly are pivotable between a stowed position, a first deployed position in which they support the rear end of the detachable main portion at drive-in height when it is not attached to the tractor, and a second deployed position in which they engage with abutments on the sub-frame and are secured to the hydraulic piston-and-cylinder assemblies for pivoting the boom assembly to lock said assembly in its fully raised position whilst the detachable main portion is attached to the tractor.

2. A front loader according to claim 1, wherein the support struts are telescopic whereby they are retracted whilst in their stowed position and extended whilst in their first and second deployed positions.

3. A front loader according to claim 1, wherein auxiliary struts are pivotally connected to the respective support struts, secureable in contiguous parallel inoperative relationship thereto, and pivotable into operative position whilst the support struts are in their first deployed position so as to secure the support struts to the forward part of the boom assembly at an appropriate angle.

* * * * *